INVENTORS
JOHN P. FERRIS.
ERNST WIEDMANN.
BY
*Ralph W. Barnes*
ATTORNEY.

INVENTORS
JOHN P. FERRIS.
ERNST WIEDMANN.
BY
ATTORNEY.

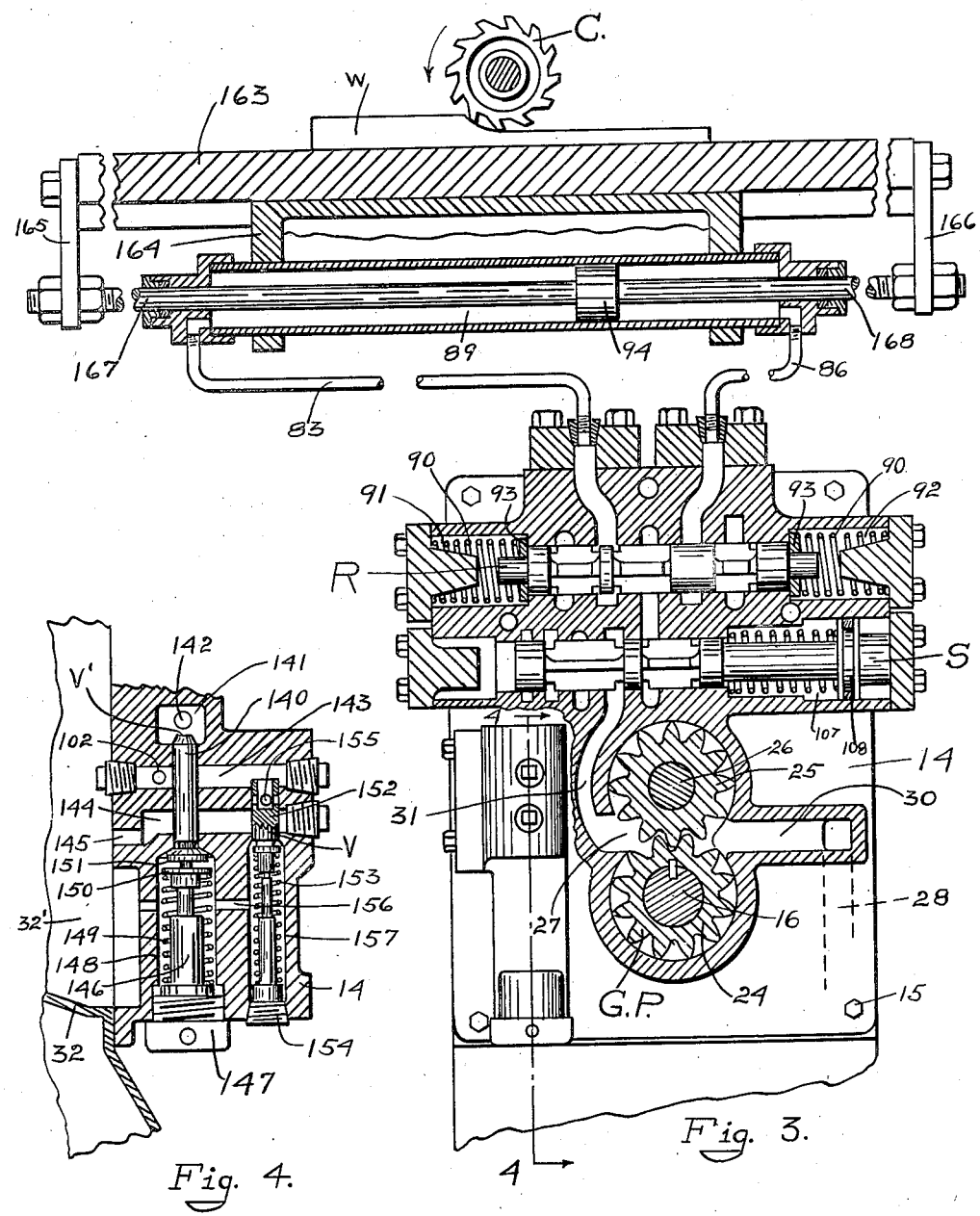

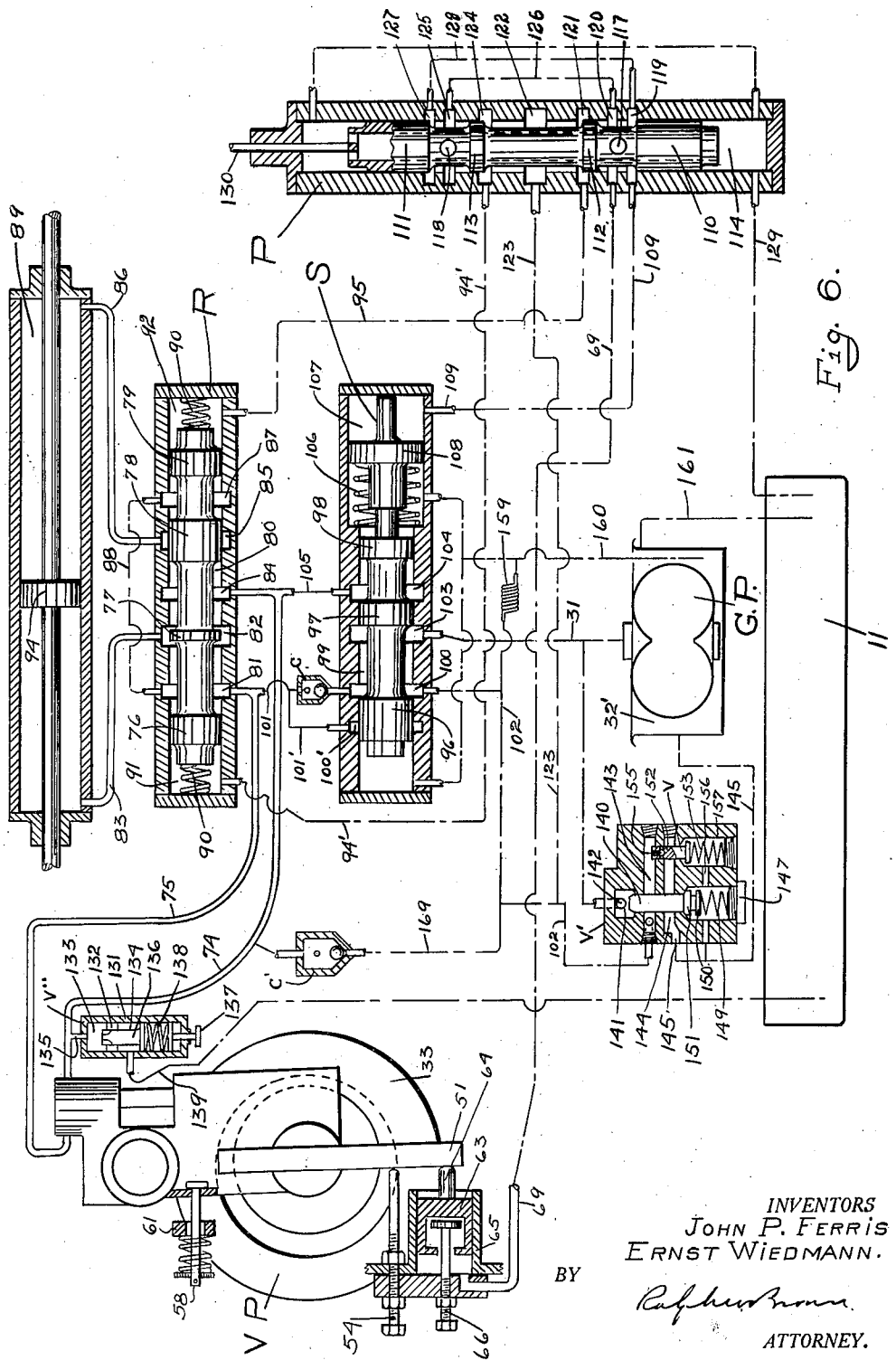

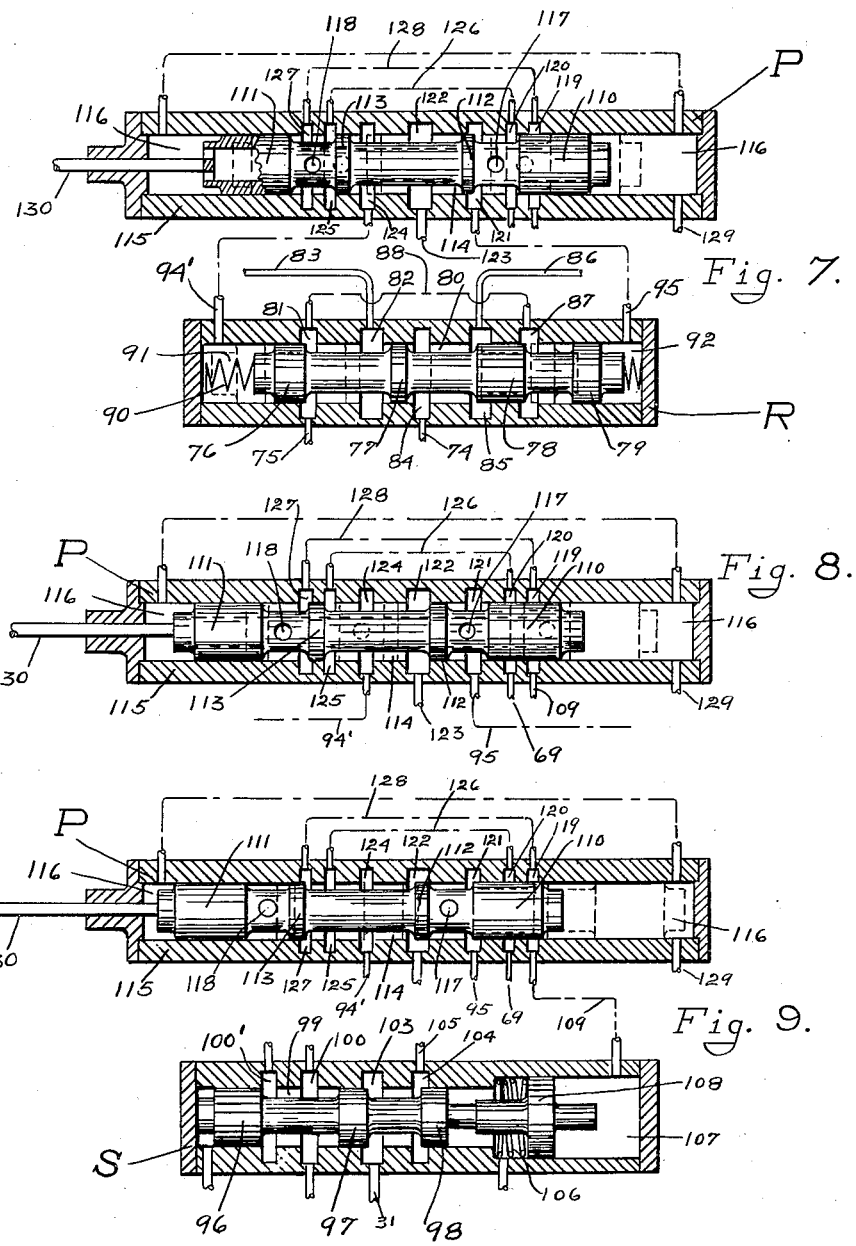

Patented Sept. 18, 1934

1,974,137

UNITED STATES PATENT OFFICE 1,974,137

HYDRAULIC TRANSMISSION

John P. Ferris and Ernst Wiedmann, Milwaukee, Wis., assignors to The Oilgear Company, Milwaukee, Wis., a corporation of Wisconsin Application August 30, 1929, Serial No. 389,334

13 Claims. (Cl. 60—52)

This invention relates to constant speed variable delivery pumps and particularly to hydraulic controls therefor.

Such pumps are now quite extensively used in the machine tool art as a source of hydraulic pressure for various hydraulic feed mechanisms therein employed. A common type of pump for that purpose ordinarily includes a variable displacement, multiple piston pump unit, capable of delivering liquid at high pressure and at a steady and accurately regulated rate throughout a limited rate range, together with a constant displacement pump unit, ordinarily contained in the same casing and driven by the same shaft, and whose discharge is available to increase the total output of the pump.

A pump of the character mentioned is fully described in the copending application of Walter Ferris, Serial No. 87,791, filed February 12, 1926, which is now matured into Patent No. 1,854,127. The pump therein described is placed under the control of a multi-position pilot valve which functions to control certain displacement regulating mechanisms for the variable displacement pump unit and also to control a valve which handles and directs the delivery from the constant displacement pump unit.

An object of the present invention is the provision of an improved control mechanism for pumps of the type mentioned which will possess all the advantages of the pump described in the application hereinabove identified as well as additional advantages which will hereinafter appear.

Another object is the provision of an improved hydraulic feed mechanism by which a pump of the type mentioned may be employed to marked advantage in the feeding of milling machine tables.

Other objects and advantages will appear from the following description of an illustrative embodiment of the present invention.

In the drawings:—

Fig. 3 is a sectional view taken substantially along the line 3—3 of Fig. 1 showing the pump connected to the feed cylinder of a milling machine table.

Fig. 4 is a sectional view of certain pressure relief valves and is taken along the line 4—4 of Fig. 3.

Fig. 6 is a diagrammatic illustration of a complete hydraulic circuit including the pump, its control valves and feed cylinder fed thereby.

Fig. 7 is a diagrammatic illustration of the main control valve and a second valve with which it is connected illustrating certain characteristic positions thereof.

Fig. 8 is a diagrammatic illustration of the control valve alone in another characteristic position.

Fig. 9 is a view similar to Fig. 7 showing the control valve in another characteristic position and connected with a third valve.

Figure 1:
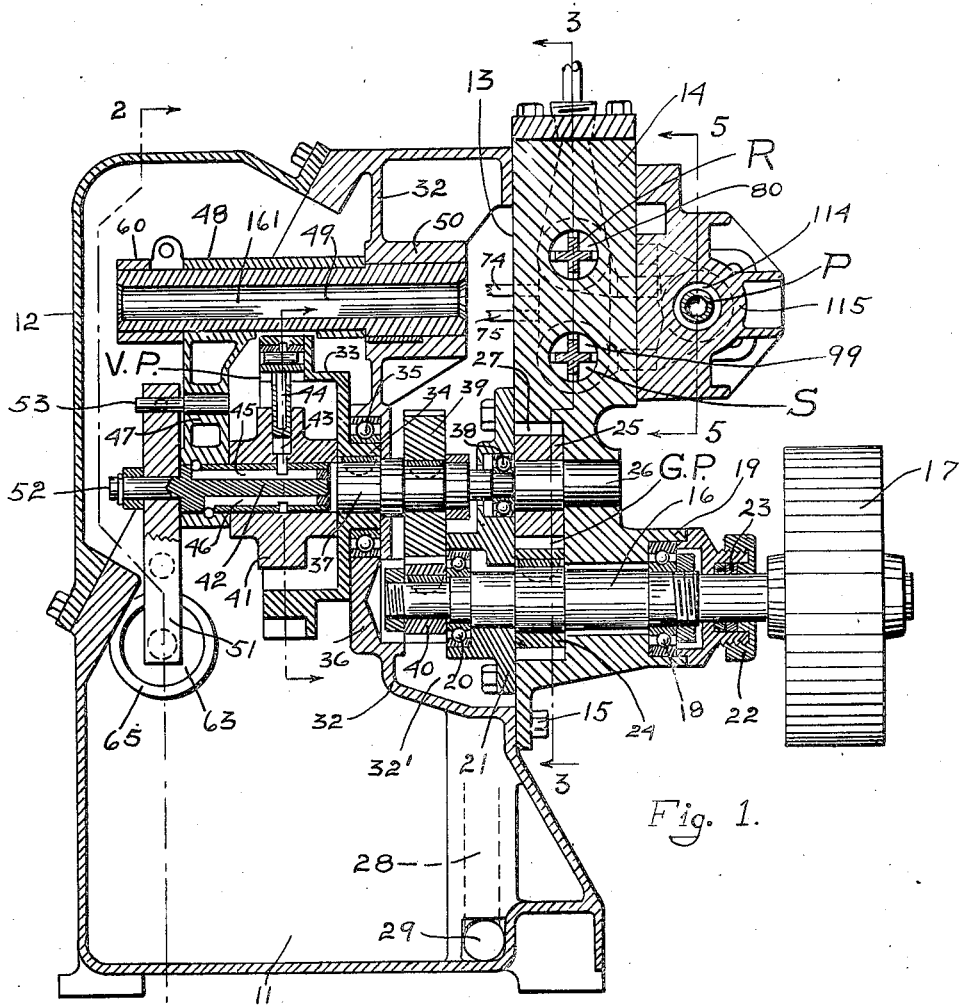
Figure 1 is a vertical sectional view on the line 1—1 of Fig. 2 of a pump constructed in accordance with the present invention.

The pump shown is supported and housed within a substantially rectangular casing 10 the lower portion 11 of which serves as a liquid reservoir or sump and the upper rear portion 12 of which is removable to permit ready access to the enclosed parts for inspection, adjustment, and replacement or repair. An opening 13 in the front of the casing is covered by a block 14, preferably in the form of a casting removably fixed to the front face of the casing by bolts 15 or otherwise. The block 14 supports a drive shaft 16 which is driven at constant speed from an appropriate power source through a pulley 17 or otherwise. The shaft 16 is supported adjacent one end in appropriate anti-friction bearings 18 within the outer end of a hub portion 19, projecting outwardly from the block 14, and adjacent the other end in similar bearings 20 within a casting 21 removably fixed to the inner face of the block 14. The outer end of the hub portion 19 is closed by an end cap 22 provided with appropriate packing glands 23 to prevent the escape of lubricant along the shaft.

The drive shaft carries a gear 24, keyed thereto, which meshes with a second gear 25, rotatable upon a stub shaft 26 fixed in the block 14. Gears 24 and 25 are closely fitted within a chamber 27 formed in the inner face of the block 14 and covered by the casting 21 hereinabove mentioned. The gears coact with each other and with the chamber to form a gear pump of a well known type driven by the shaft 16. As indicated in Figs. 1 and 3 this pump receives its supply of liquid from the reservoir in the bottom of the pump casing through an appropriate conduit 28 which is open to the reservoir through a port 29 at its lower end and which communicates at its upper end with a passage 30 formed in the block 14 and leading to one side of the chamber 27. This pump discharges through a passage 31 formed in the block 14 and leading from the other side of the chamber 27.

The upper forward portion of the casing 10 adjacent the block 14 is separated from the remainder of the casing by a partition 32 so as to form an auxiliary reservoir 32' which is supplied with oil in a manner to be later described. This partition also constitutes a support for the component parts of the variable displacement pump unit which will now be described. This pump unit is of a well known type and does not differ materially from that described in the application hereinabove identified. It includes a cup-shaped rotary impeller 33 having a hub 34 journaled in appropriate anti-friction bearings 35 within a thickened portion 36 of the partition 32. The hub 34 is also fixed to one end of a shaft 37 which is journaled at its other end in anti-friction bearings 38 housed within the casting 21. The shaft 37 is driven by a gear 39 fixed thereto and meshing with a pinion 40 fixed to the end of the drive shaft 16. A cylinder barrel 41 of usual form, rotatable upon a pintle 42, is provided with a series of radial cylinder bores one of which is shown at 43 and each of which contains a piston 44. During constant speed rotation of shaft 37 the impeller 33 coacts with the pistons 44 in a well known manner to cause the same to reciprocate in their bores to an extent dependent upon the degree of eccentricity between the impeller and cylinder barrel. The pintle 42 contains the usual upper and lower longitudinal passages 45 and 46 which serve as liquid supply and discharge passages, respectively, for this pump unit. In this instance the pintle is shown anchored in the lower end of a pendulum 47 which is supported by an integral sleeve 48 rockably supported upon a hollow shaft 49. Shaft 49 is anchored in and extends horizontally from a heavy boss 50 formed on the partition 32. The arrangement is such that when the pintle 42 is concentric with the shaft 37 the pistons 44 do not reciprocate and the displacement of this pump is zero, but when the pintle is shifted from this position by angular adjustment of the pendulum 47 this pump unit then delivers liquid into one of the pintle passages 45 or 46 at a rate dependent upon the degree of eccentricity thus established between the pintle 42 and shaft 37. Since the construction and operation of pumps of this type are old and well known in the art further detailed description thereof is deemed unnecessary.

Figure 2:
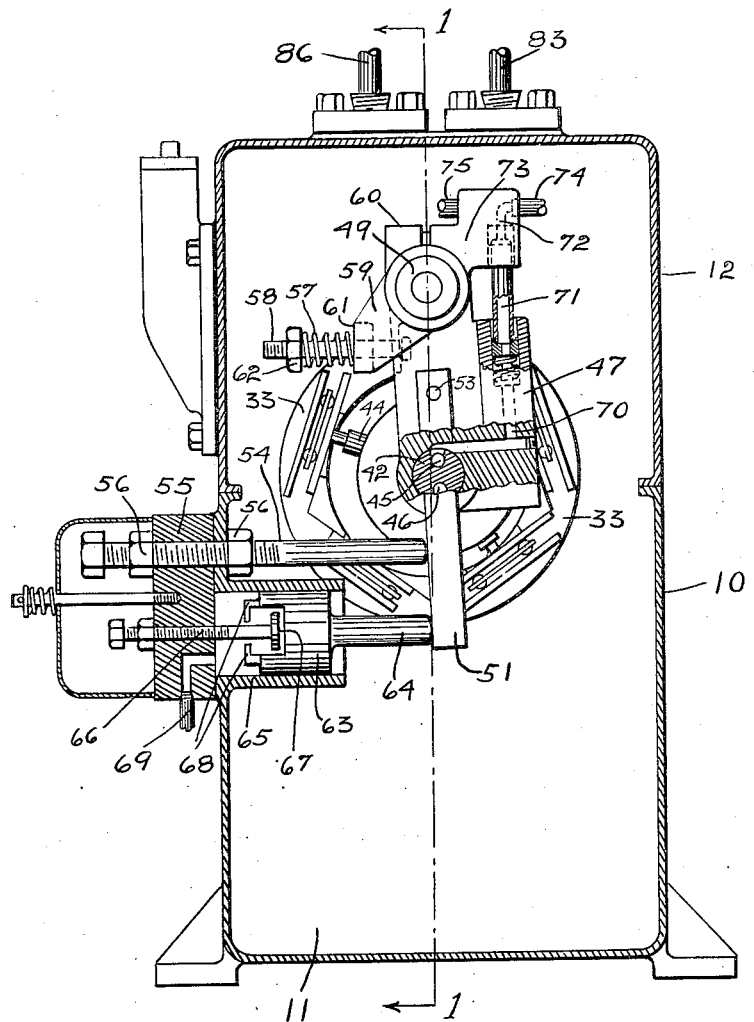
Fig. 2 is a sectional view taken substantially along the line 2—2 of Fig. 1.

In this instance however the position of the pintle 42 is regulated and controlled by mechanism which will now be described. This mechanism includes an arm 51 rigidly secured to the pendulum 47 by a reduced extension 52 of the pintle 42 which projects therethrough and by a pin 53 which also projects therethrough and into the pendulum. As indicated in Fig. 2 this arm normally bears against the end of a stop screw 54 threaded in a block 55 fixed to one side wall of the casing, the stop screw being secured in any position of adjustment by appropriate lock nuts 56. The arm 51 is yieldably held against the stop screw by a spring 57, carried by a short tension rod 58 connected at one end to the pendulum 47, and extending loosely through an arm 59 which is removably clamped to the end of shaft 49 by a split clamp ring 60. The spring 57 is confined between the end 61 of the arm 59 and a nut 62 threaded onto the end of the rod 58, so as to maintain a tension in this rod which yieldably urges the pendulum 47 toward the left. (Fig. 2). With the stop screw 54 in the position shown in Fig. 2 the pendulum is so positioned that the pintle 42 is slightly eccentric with respect to the shaft 37 and the pump discharges at a relatively slow rate. To effect an increase in pump displacement a piston 63 is provided having a push pin 64 which bears against the arm 51, the piston being fitted within a cylinder 65 formed integral with the casing 10 and closed at its rear end by the block 55. A stop screw 66 adjustably threaded in the block 55 is provided with a head 67 which coacts with stop elements 68 on the rear end of the piston 63 to limit the advance thereof. Upon the introduction of fluid pressure to the rear end of the cylinder 65 through a pipe 69, the piston 63 is advanced as far as the head 67 permits, to thereby force the pendulum 47 and pintle 42 through a definite distance to effect a definite increase in pump displacement. Upon release of this fluid pressure the pendulum promptly returns to the position shown in Fig. 2 by the action of spring 57.

The upper pintle passage 45 is permanently connected with a passage 70 in the pendulum 47 which communicates through a tube 71 with a passage 72 formed in a head 73 carried by the clamp ring 60. Passage 72 communicates with a pipe 74. The lower pintle passage 46 is permanently connected in a similar manner with a second pipe 75 leading from the head 73. Since these connections are fully shown and described in the application hereinabove identified a further or more detailed description thereof is deemed unnecessary. As indicated in Fig. 1 the pipes 74 and 75 lead to appropriate passages in the block 14 which will be hereinafter described.

From the foregoing it will be noted that the pump shown includes a constant displacement gear pump unit G. P. and a variable displacement pump unit V. P. both driven at constant speed from the same drive shaft 16, the pinion 40 and gear 39 forming a speed reduction power connection between the shafts 16 and 37 through which the variable displacement pump unit is driven at a slower speed than the gear pump unit. The gear pump serves a triple purpose. It supplies the necessary hydraulic pressure for operating the stroke changing piston 63 and certain other parts of the control mechanism to be later described; it normally serves to maintain the hydraulic circuit flooded with liquid under pressure, so as to prevent the formation of voids and air pockets therein, and also to maintain the auxiliary reservoir 32' flooded; and it serves to provide an increased flow of liquid within the circuit, when desired, by adding its discharge to that of the variable displacement pump.

The sole function of the variable displacement pump is to supply driving liquid to the hydraulic circuit at any selected rate. Communication between the variable displacement pump and the hydraulic circuit fed thereby is controlled in this instance by a reversing valve R shown in detail in Fig. 3 and diagrammatically illustrated in Figs. 6 and 7. It comprises a plunger having four longitudinally spaced heads 76, 77, 78, and 79 closely fitted within a bore 80 formed within the upper portion of the block 14. An annular groove 81 formed in the bore 80 between heads 76 and 77 communicates with pipe 75 leading to the pump V. P. A second groove 82 adjacent the head 77, but wider than this head, communicates with a pipe 83. A third groove 84, between the heads 77 and 78, communicates with the pump discharge pipe 74. A fourth groove 85, adjacent the head 78 and narrower than that head, communicates with a pipe 86. A fifth groove 87 between heads 78 and 79 communicates with groove 81 through a by-pass 88. The pipes 83 and 86 are shown connected to the opposite ends of a feed cylinder 89 to be later described so that they constitute the opposite sides of a work circuit. Caged springs 90 in opposite end chambers 91 and 92 press upon collars 93 to thereby yieldably retain the valve plunger in the intermediate position shown in Figs. 3 and 6. In that position liquid supplied from the pump V. P. through pipe 74 passes freely around the head 77 and returns to the pump through pipe 75. It will be noted that, in this position of the valve, the head 78 thereof completely covers the groove 85 so that pipe 86 is effectively blocked and the piston 94 in cylinder 89 is held against movement.

When the valve plunger is shifted into the right extreme position shown in full lines in Fig. 7 the liquid supplied through pipe 74 then passes from groove 84 through groove 85 and pipe 86 into the right end of the cylinder to thereby drive the piston 94 toward the left at a rate corresponding to the rate of discharge from the pump V. P., the liquid from the other end of the cylinder returning to the pump through pipe 83, grooves 82 and 81, and pipe 75. When the valve plunger is shifted into the left extreme position indicated in dotted lines in Fig. 7, liquid from pipe 74 is directed into the left end of the cylinder through grooves 84 and 82, and pipe 83 to drive the piston 94 toward the right at a rate corresponding to pump displacement, the liquid from the right end of the cylinder returning to the pump through pipe 86, grooves 85 and 87, by-pass 88, groove 81, and pipe 75. This valve plunger is shifted into one extreme position or the other by subjecting one or the other end chambers 91 or 92 to fluid pressure through passages 94' or 95 which are under the control of a pilot valve to be later described.

The discharge of the gear pump G. P. is placed under the control of a switch valve S shown in detail in Fig. 3 and diagrammatically illustrated in Figs. 6 and 9. This valve comprises a valve plunger having three spaced heads 96, 97, and 98 closely fitted within a bore 99 formed in the block 14 immediately below the bore 80 of valve R. An annular groove 100 in the bore, between the heads 96 and 97, communicates with the groove 81 in valve R through a passage 101 and a check valve C and also communicates through a passage 102 with a low pressure relief valve $v$ to be later described. A similar groove 103, adjacent the head 97 communicates with the discharge passage 31 from the gear pump. A third groove 104 communicates with the groove 84 of the valve R through a passage 105. Another groove 100' normally blocked by the head 96 is connected to the passage 101 through a passage 101' which functions under certain conditions to by-pass the check valve C. This valve plunger is yieldably retained in the position shown in Figs. 3 and 6 by a spring 106, housed within the inner end of an end chamber 107, and bearing against a piston 108 which is closely fitted within the end chamber and permanently connected to the valve plunger. With the valve plunger in this position the liquid discharged from the gear pump passes from the passage 31 through grooves 103 and 100, check valve C, and passage 101 into the return pipe 75 so as to keep this pipe and all parts connected therewith flooded with liquid at gear pump pressure, all excess liquid discharged from the gear pump being directed from the groove 100 through the passage 102 to and through the low pressure relief valve $v$. Under those conditions the gear pump pressure is obviously determined by the setting of the low pressure relief valve $v$.

The plunger of valve S is shiftable into the left extreme position of Fig. 9, against the resistance of spring 106, whenever the outer end of the end chamber 107 is subjected to fluid pressure admitted through a passage 109. In this left extreme position the head 97 of the valve plunger blocks communication between grooves 100 and 103, and opens communication between grooves 103 and 104 so that the discharge from the gear pump is then directed from passage 31, through passage 105, and into pipe 74 where it combines with the discharge from the variable displacement pump V. P. to thereby effect a marked increase in the rate of flow in the hydraulic circuit and a consequent increase in the rate of travel of the piston 94. With this increase in the rate of piston travel liquid is discharged ahead of the piston at a rate greater than can be consumed by the variable displacement pump and this excess finds its way back through passages 101 and 101', grooves 100' and 100, and passage 102 to the low pressure relief valve $v$ through which it escapes. It will be noted that under those conditions a back pressure is maintained in passages 101 and 102 and in the return pipe 75 dependent upon the setting of the relief valve $v$.

The reversing valve R, the switch valve S, and the stroke changing cylinder 65 are all placed under the control of a pilot valve P which will now be described. This valve is shown in detail in Fig. 5 and is diagrammatically illustrated in Figs. 6, 7, 8, and 9. It comprises a valve plunger having two wide end heads 110 and 111 and two intermediate narrow heads 112 and 113 all closely fitted within a bore 114 formed in a block 115 attached to the upper portion of block 14. This plunger is hollow from end to end so that the ends 116 of the bore communicate therethrough. A port 117 between the heads 110 and 112 and a port 118 between the heads 113 and 111 communicate with the interior of the plunger. An annular groove 119 formed in the bore 114 communicates with passage 109 leading to the end chamber 107 of the switch valve S. A similar groove 120 communicates with the pipe 69 leading to the stroke changing cylinder 65. Another groove 121 communicates with passage 95 leading to the right end chamber 92 of valve R. Another groove 122 communicates through a passage 123 with passage 102. Another groove 124 communicates with passage 94' leading to the left end chamber 91 of valve R. Another groove 125 communicates with groove 120 through a passage 126. Another groove 127 communicates with groove 119 through a passage 128. A drain passage 129 connected to one of the ends 116 of the bore 114 leads to the reservoir in the bottom of the pump casing. This valve plunger may be shifted into any one of seven characteristic positions and in this instance is provided with an operating stem 130 fixed to one end thereof. This stem may be operated and controlled by hand or by automatic control mechanism such for instance as that described in the application hereinabove identified.

Figure 5:
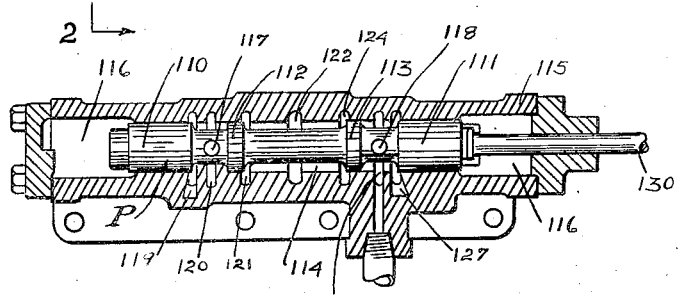
Fig. 5 is a longitudinal sectional view of a control valve and is taken along the line 5—5 of Fig. 1.

In all positions of the plunger of this valve P the annular space between the intermediate heads 112 and 113 is flooded with liquid under pressure through the passage 123 leading from passage 102, so that when the plunger is in the middle or neutral position shown in Figs. 5 and 6 both end chambers 91 and 92 of the valve R are exposed to pressure through passages 94' and 95 and grooves 124 and 121, respectively. The plunger of valve R is thus retained in neutral position so that the circuit of the pump V. P. is by-passed through the grooves 84, 82, and 81 and the motor circuit is blocked by the head 78. It will also be noted that with the plunger of the pilot valve P in this middle position all four grooves 119, 120, 125 and 127 are open to the drain passage 129 through the ports 117 and 118 and the longitudinal passage in the valve plunger, so that there is no pressure in the end chamber 107 of switch valve S and the plunger thereof is held by spring 106 in the right extreme position of Figs. 3 and 6, and so that there is no pressure in the stroke changing cylinder 65 and the variable displacement pump V. P. is producing an idle circulation of liquid through pipes 74 and 75 at a slow rate determined by the setting of the stop screw 54.

When the plunger of the pilot valve P is shifted one step into the full line position of Fig. 7, end chamber 92 is then opened to the drain passage 129 through port 117 and the passage in the plunger, so that the plunger of the valve R is shifted into the right extreme position, shown in full lines in Fig. 7, by the pressure which continues to exist in end chamber 91. When thus shifted pump delivery pipe 74 is connected to pipe 86 and pipe 83 is connected to the return pipe 75, in the manner previously described, so that the piston 94 promptly moves toward the left at a slow rate depending upon the setting of the stop screw 54. When the plunger of valve P is shifted one step on the other side of neutral into the position shown in dotted lines in Fig. 7, the passage 94' and end chamber 91 are opened to the drain passage 129 through port 118, and the passage 95 and end chamber 92 are exposed to the pressure in passage 123, so that the plunger of valve R is shifted toward the left into the dotted line position of Fig. 7 to thereby connect pipe 74 with pipe 83 and pipe 75 with pipe 86, as hereinabove explained, whereupon the piston 94 promptly moves toward the right at a slow rate.

When the plunger of the pilot valve is shifted a second step beyond neutral into the full line position of Fig. 8 passage 94' and end chamber 91 are exposed to the pressure in pipe 123 and passage 95 and end chamber 92 are open to the drain pipe 129 through port 117, so that the valve R assumes the right extreme full line position of Fig. 7, and the pipe 74 is thereby connected to pipe 86 and pipe 75 with pipe 83. It will be noted that in this position of the pilot valve groove 125 is also exposed to the pressure in pipe 123, and that this pressure is transmitted through passage 126, groove 120, and pipe 69 to the stroke changing cylinder 65, so that the piston 63 is advanced and the displacement of pump V. P. is increased to an extent dependent upon the setting of the stop screw 66. The piston 94 is thus caused to travel toward the left at a correspondingly increased rate. When the plunger of valve P is shifted a second step on the other side of neutral, into the position indicated in dotted lines in Fig. 8, passage 94' and end chamber 91 are opened to the drain pipe 129 through port 118, and passage 95 and end chamber 92 are exposed to the pressure in pipe 123, so that the reversing valve R assumes the left extreme dotted line position of Fig. 7. Also the groove 125 is covered by the head 111 and the groove 120 is exposed to the pressure in pipe 123, so that the stroke changing piston 63 is again advanced and the piston 94 travels toward the right at an increased rate dependent upon the setting of the stop screw 66.

When the plunger of the pilot valve is shifted a third step beyond its neutral position into the full line position of Fig. 9 passage 95 and end chamber 92 are open to the drain passage 129, and passage 94' and end chamber 91 are exposed to the pressure in pipe 123 so that valve R assumes the right extreme full line position of Fig. 7; also pipe 69 is exposed to the pressure in pipe 123 through groove 125, passage 126 and groove 120, so that the stroke changing piston 63 is advanced; also passage 109 is exposed to the pressure in pipe 123 through groove 127, passage 128, and groove 119, so that the switch valve S assumes the left extreme position of Fig. 9 and the discharge from the gear pump passes from groove 103 through passage 105 to groove 84 where it is combined with the discharge from the pump V. P. to effect rapid travel of the piston 94 toward the left. When the plunger of the pilot valve is shifted a third step on the other side of neutral into the dotted line position of Fig. 9 groove 124 only is open to the drain passage 129, all of the other grooves being exposed to pressure, so that the reversing valve R assumes the left extreme dotted line position of Fig. 7, the stroke changing piston 63 is advanced, and the switch valve S assumes the left extreme position of Fig. 9, whereby the discharge from the gear pump is added to that from the variable displacement pump and directed through pipe 83 to thereby drive the piston 94 toward the right at a rapid rate.

From the foregoing it will be noted that when the pilot valve P is in the middle or neutral position of Fig. 6 the reversing valve R is in the intermediate neutral position of that figure and serves to by-pass the circuit of the variable displacement pump so that piston 94 is at rest. Then as the plunger of the pilot valve is shifted in one direction or the other from neutral its first function is to effect the shifting of the reversing valve R into either the full line or dotted line position of Fig. 7, so as to cause the piston 94 to travel in one direction or the other at a slow rate determined by the setting of stop screw 54. Throughout extended adjustment of the pilot valve from neutral the reversing valve remains in one of those two extreme positions. Upon extended movement of the pilot valve it next functions to effect an advance of the stroke changing piston 64 and thereby increase the rate of discharge from pump V. P. and consequently increase the rate of movement of the piston. Then as the pilot valve is shifted into either extreme position the switch valve S assumes the position of Fig. 9 to thereby combine the gear pump discharge with the variable displacement pump discharge and thus materially increase the rate of movement of piston. The piston 94 is thus caused to travel at either of two selected speeds in either direction by liquid supplied alone from the variable displacement pump, or at much higher speeds in either direction by liquid supplied from both pumps.

When this system is applied as a feed mechanism for a machine tool the stop screws 54 and 66 are ordinarily so adjusted as to provide low and high cutting feeds appropriate for the work involved, the discharge from the gear pump being combined with that from the variable displacement pump to impart a rapid motion to the piston whenever idle travel or rapid traverse motions are desired. It is of course understood that in instances when the machine does not require two cutting feeds the stroke changing cylinder 65 and connected parts may be eliminated or the effect thereof eliminated by appropriate adjustment of the screw 66 to hold the piston 63 inactive.

The circuit of the variable displacement pump V. P. is protected against excessive pressures by an appropriate form of relief valve such as that shown at $v''$ in Fig. 6. The valve shown comprises a block 131 containing a cylindrical bore which is divided by a partition 132 into separate compartments 133 and 134. Compartment 133 communicates with the pump discharge pipe 74 through pipe 135. A spring loaded plunger 136 closely fitted in a port in partition 132 normally blocks communication between the compartments. An adjustable screw 137 determines the degree of pressure exerted by the spring 138 upon the plunger. A pipe 139 communicating with the compartment 134 leads to the reservoir in the bottom of the pump casing. Whenever the pressure in pipe 74 becomes excessive the plunger 136 is forced downwardly, against the action of the spring, until liquid escapes from compartment 133 to compartment 134 and through pipe 139 to the reservoir. The screw 137 is commonly so adjusted that the valve does not open except at pressures in excess of one thousand pounds per square inch.

It will be noted that when the switch valve S assumes the position shown in Fig. 9 so as to direct the discharge from the gear pump into the working side of the hydraulic circuit, the head 97 thereof blocks communication between the grooves 103 and 100 so that the low pressure relief valve $v$ is effectively cut off from the gear pump discharge passage 31. A second relief valve $v'$, ordinarily set at a much higher pressure, is provided for limiting the gear pump pressure while connected with the working side of the circuit. In this instance relief valve $v'$ is combined with relief valve $v$, as shown in detail in Fig. 4. Both valves are disposed in the lower portion of the block 14 at one side of the gear pump. The valve $v'$ comprises a plunger 140 closely fitted for lengthwise reciprocation in an appropriate bore in the block 14 with its upper tapered end exposed to the pressure in a chamber 141. Chamber 141 communicates through a passage 142 with the gear pump discharge passage 31. The plunger projects through a chamber 143, which communicates with passage 102 (Fig. 6), and through a chamber 144 below chamber 143. Chamber 144 discharges into the auxiliary reservoir 32' through a passage 145. The plunger 140 carries a tail extension 146 which extends loosely into a plug 147 screwed into the open end of a bore 148. A spring 149 between the head of the plug and a collar 150 on the tail 146 yieldably retains the plunger in the position shown with a stop collar 151 thereon against the end of the bore 148. The tension in the spring 149 is adjustable by adjustment of the plug 147 within the bore.

The valve $v$ comprises a plunger 152 also closely fitted in an appropriate bore in the block 14 and arranged to normally extend through the chamber 144 and into the chamber 143. This plunger is also yieldably retained in the position shown by a spring 153 and plug 154 similar to those just described in connection with the valve $v'$. The upper end of plunger 152 is hollow and provided with ports 155 which are normally covered by the wall of the bore in which the plunger is fitted. A drain duct 156 leading from the lower bore 157 of valve $v$ and intersecting the bore 148 of valve $v'$ discharges into the auxiliary reservoir 32'.

The arrangement is such that when the hydraulic pressure in passage 102 and chamber 143 is sufficient to force the plunger 152 downwardly against the resistance of spring 153, liquid from chamber 143 escapes through the ports 155 into chamber 144 and finds its way to the auxiliary reservoir 32', through passage 145. The tension in spring 153 is ordinarily so adjusted as to require a pressure of about fifty pounds per square inch to thus open the valve so that such a pressure is maintained within the passage 102 and connected parts. The tension in spring 149 is ordinarily so adjusted as to require a hydraulic pressure of about four hundred pounds to force the plunger 140 downwardly a sufficient amount to permit liquid to escape from chamber 141 to chamber 143. The liquid thus entering chamber 143 may of course escape past the plunger 152 into the auxiliary reservoir in the manner described.

It will be noted that although the chamber 141 of valve $v'$ is permanently connected with the discharge passage 31 from the gear pump this valve does not function so long as the switch valve S is in the position of Figs. 3 and 6 and the chamber 143 of the valve $v$ is thereby connected to the discharge passage 31, since, under those conditions the valve $v$ keeps the pump discharge pressure at fifty pounds per square inch. However when the switch valve S assumes the position shown in Fig. 9, so as to direct the discharge from the gear pump into the working side of the circuit, the low pressure valve $v$ is cut off from the discharge passage 31 and the pressure in the discharge passage may then build up as high as the relief valve $v'$ permits. The valve $v'$ thus determines the maximum working pressure available in the work circuit while the gear pump discharge is directed into the working side thereof, the four hundred pounds pressure limit permitted by this valve being sufficient to drive the piston 94 during idle or rapid traverse movements thereof. When the piston 94 is actually under the load of a cut the variable displacement pump V. P. only is connected to the working side of the circuit and under those conditions a pressure up to one thousand pounds or more is available, as determined by the relief valve $v''$.

The primary purpose of the auxiliary reservoir 32' is to provide a liquid seal for the gear pump G. P. which serves to prevent the admission of air to the pump chamber 37. Without such a seal the partial vacuum in the suction side of that chamber, necessary to lift liquid to the pump from the main reservoir 11, would tend to induce atmospheric air thereinto. This reservoir 32' also serves as a source of lubricant for the several shaft bearings and the reduction gear set contained therein. As previously mentioned this reservoir 32' receives liquid discharged from the low pressure relief valve $v$ but to insure that it is maintained flooded under all conditions of operation, a choke in the form of a coil of small tubing 159 is provided which forms a restricted connection between the low pressure passage 102 and a passage 160 leading to the auxiliary reservoir. Since, as above pointed out, a hydraulic pressure of about fifty pounds per square inch exists at all times in the passage 102, there is a small but continuous flow of liquid through the tubing 159 and passage 160 into the auxiliary reservoir. The liquid level in the auxiliary reservoir is marked by the overflow passage 161 in the shaft 49 through which excess liquid escapes therefrom into the main reservoir 11.

It will be understood that the term passages wherever used in the foregoing description refers to passages cored out or otherwise formed in the body of the block 14 or associated block 115, which, for purposes of explanation, are diagrammatically indicated by dot-and-dash lines in Figs. 6 to 9.

Although the pump hereinabove described may be applied to various types of machine tools or the like it is shown in Fig. 3 connected to the feed cylinder 89 of a milling machine table 163. The table 163 is shown mounted for lengthwise travel on the bed 164 of the machine and provided with two depending end brackets 165 and 166 which are connected to the opposite ends 167 and 168, respectively, of a double ended piston rod. The piston rod extends through both ends of the cylinder 89 which is anchored in the bed 164. Through these connections the table 163 is caused to travel with and by the piston 94. By reason of the double ended piston rod the effective pressure areas of both faces of the piston are equal so that during movement of the piston in either direction the rate of liquid supplied to one end of the cylinder is always equal to the rate of discharge from the other end thereof. Liquid is thus supplied to the pump V. P. from one end of the cylinder at the same rate that liquid is supplied by the pump to the other end of the cylinder. A circuit having these characteristics is commonly known as a non-differential circuit, as distinguished from a differential circuit involving a differential piston and requiring provision for supplying additional liquid to or the escape of excess liquid from the circuit.

In a mechanically fed milling machine it is impracticable to feed the table in the direction of the cutting action or with the cut because the cutter tends to advance the table ahead of its normal feed rate and the back-lash of the gears in a mechanical feed permits a momentary advance causing tool breakage. In a hydraulic feed of the character hereinabove described the variable displacement pump serves as an accurate liquid metering device which insures a uniform rate of discharge from as well as to the cylinder, and thus serves to positively check and prevent any momentary advance of the table above its normal feed rate. With such a feed it is possible to feed the table with the cut without danger to the cutter, particularly when a non-differential circuit is employed and when provision is made to keep the circuit flooded and to prevent the escape of liquid therefrom.

During the cutting action the table is fed by liquid supplied solely by the variable displacement pump V. P., the switch valve S being in the position shown in Fig. 6, so that the check valve c effectively prevents the escape of liquid from the return side of the circuit (pipe 75) to the low pressure relief valve v, although the return side of the circuit is maintained flooded under gear pump pressure through the check valve c. Now assume that the milling cutter C is continuously driven in the direction of the arrow (Fig. 3) and that the table 163 is being fed toward the right by liquid supplied to the left end of the cylinder through the pump delivery pipe 74. Under those conditions the action of the cutter upon the work w tends to advance the table and work ahead of its normal feed rate. Since the check valve c prevents the escape of liquid from the return pipe 75, and since the pump V. P. determines the rate of flow through pipe 75, the rate of discharge of liquid from the right end of the cylinder is effectively governed so that it is impossible for the table to advance ahead of its prescribed feed rate.

The tendency of the table to advance ahead of its prescribed rate is thus resisted by the column of liquid within the pipes 86 and 75 with a consequent increase in pressure within those pipes and a corresponding reduction in pressure within pipes 74 and 83. In order to avoid producing a void or air pocket within pipe 74 and 83 when the pressure therein is thus reduced, the pipe 74 is connected to the passage 102 through a check valve c' and passage 169. The check valve c' prevents the escape of liquid from pipe 74 but permits liquid to enter pipe 74 from passage 102 at gear pump pressure to thereby promptly fill any void that might otherwise occur therein.

Various changes may be made in the embodiment of the invention hereinabove specifically described without departing from or sacrificing any of the advantages of the invention as defined in the appended claims.

We claim:—

1. The combination of a variable displacement pump, a hydraulic motor actuated by liquid supplied from said pump, fluid actuated means for regulating pump displacement, a fluid actuated valve through which liquid supplied from said pump is directed to said motor for controlling the direction of motor actuation, and means for controlling the application of fluid pressure to said displacement regulating means and to said fluid actuated valve to thereby regulate the rate and direction of motor actuation.

2. The combination of a variable displacement pump, a hydraulic motor actuated by liquid supplied from said pump, fluid actuated means for regulating pump displacement, a valve through which liquid supplied from said pump is directed to said motor for controlling the direction of motor actuation, fluid actuated means for actuating said valve, and a pilot valve for controlling the operation of both of said fluid actuated means.

3. The combiantion of a variable displacement pump, a hydraulic motor actuated by liquid supplied from said pump, manually operated means for regulating pump displacement, a second fluid actuated means for regulating pump displacement, a fluid actuated valve through which liquid supplied from said pump is directed to said motor for controlling the direction of motor actuation, and means for controlling the application of fluid pressure to said fluid actuated means and to said fluid actuated valve.

4. The combination of a variable displacement pump, a hydraulic motor actuated by liquid supplied from said pump, means for regulating pump displacement, a valve through which liquid supplied from said pump is directed to said motor for controlling the direction of motor actuation, a second pump, means actuated by fluid pressure generated by said second pump for operating said valve, and means actuated by fluid pressure generated by said second pump for operating said displacement regulating means.

5. The combination of a variable displacement pump, a hydraulic motor actuated by liquid supplied from said pump, a valve between said pump and motor for controlling the direction of motor actuation, a second pump, a second valve for connecting said second pump in driving relation with said motor, and fluid actuated means for operating both of said valves.

6. The combination of a variable displacement pump, a hydraulic motor actuated by liquid supplied from said pump, a fluid actuated valve between said pump and motor for controlling the direction of motor actuation, a second pump, a fluid actuated valve for connecting said second pump in driving relation with said motor, and valve mechanism for controlling the operation of both of said valves.

7. The combination of a variable displacement pump, a hydraulic motor actuated by liquid supplied from said pump, a fluid actuated valve between said pump and motor for controlling the direction of motor actuation, a second pump, a second fluid actuated valve for connecting said second pump in driving relation with said motor, both of said valves being actuated by fluid pressure generated by said second pump, and means for controlling both of said valves.

8. The combination of a variable displacement pump, a hydraulic motor actuated by liquid supplied from said pump, a second pump, a valve actuated by fluid pressure from said second pump for reversing the direction of motor actuation, a second valve actuated by fluid pressure from said second pump for connecting said second pump in driving relation with said motor, and a third valve for controlling the operation of both of said valves.

9. The combination of a variable displacement pump, a hydraulic motor actuated by liquid supplied from said pump, a second pump, means actuated by fluid pressure from said second pump for regulating the displacement of said variable displacement pump, a valve actuated by fluid pressure from said second pump for reversing the direction of motor actuation, a second valve actuated by fluid pressure from said second pump for connecting said second pump in driving relation with said motor, and a third valve for controlling said displacement regulating means and both of said valves.

10. The combination of a variable displacement pump, a hydraulic motor actuated by fluid supplied from said pump, fluid actuated means for regulating pump displacement, a fluid actuated valve for reversing the direction of actuation of said motor, a second pump, a fluid actuated valve for connecting said second pump in driving relation with said motor, and unitary means for controlling said regulating means and both of said valves.

11. The combination of a plurality of pumps, a hydraulic motor, separate fluid actuated valves for receiving the discharge from said pumps respectively and operable to direct the same to said motor to thereby drive said motor, and means for controlling both of said valves.

12. The combination of two pumps, a motor, a hydraulic motor circuit, a fluid actuated valve operable to combine the discharge from said pumps, and a second fluid actuated valve for receiving the discharge from one or both of said pumps and for directing it one side or the other of said motor circuit to thereby operate said motor in one direction or the other at different selected speeds, and means for controlling both of said valves.

13. The combination of a variable displacement pump, a hydraulic motor, a motor circuit through which said motor is driven from said pump, a second pump, a valve adjustable to direct the discharge from said second pump into the return side of said circuit to keep the circuit flooded or into the working side of said circuit to thereby increase the speed of said motor, check valves normally operable to prevent the escape of liquid from either side of said circuit while said second pump is connected with the return side thereof, and means for rendering one of said check valves ineffective while said second pump is connected with the working side of said circuit.

JOHN P. FERRIS.
ERNST WIEDMANN.